United States Patent
Yamaguchi (10) Patent No.: US 8,848,042 B2
(45) Date of Patent: Sep. 30, 2014

(54) DISPLAY DEVICE, VIDEO DEVICE, MENU-SCREEN DISPLAY METHOD, AND VIDEO DISPLAY SYSTEM

(75) Inventor: Hidetoshi Yamaguchi, Saitama (JP)

(73) Assignee: Sony Corporation (JP)

( * ) Notice: Subject to any disclaimer, the term of this patent is extended or adjusted under 35 U.S.C. 154(b) by 727 days.

(21) Appl. No.: 13/114,293

(22) Filed: May 24, 2011

(65) Prior Publication Data

US 2011/0292188 A1    Dec. 1, 2011

(30) Foreign Application Priority Data

May 31, 2010   (JP) .............................. P2010-124310

(51) Int. Cl.
*H04N 13/04*     (2006.01)
*H04N 13/00*     (2006.01)
*H04N 21/81*     (2011.01)
*H04N 13/02*     (2006.01)

(52) U.S. Cl.
CPC ........ *H04N 13/0456* (2013.01); *H04N 13/0497* (2013.01); *H04N 13/0239* (2013.01); *H04N 13/0404* (2013.01); *H04N 13/0055* (2013.01); *H04N 13/0296* (2013.01); *H04N 21/8146* (2013.01)
USPC .................... 348/51; 348/43; 348/46; 348/42

(58) Field of Classification Search
CPC .......... H04N 13/0497; H04N 13/0055; H04N 13/0239; H04N 13/0404
USPC ........................................ 348/51, 43, 46, 42
See application file for complete search history.

(56) References Cited

U.S. PATENT DOCUMENTS

| | | | | |
|---|---|---|---|---|
| 6,128,434 | A  * | 10/2000 | Hirayama et al. ............ | 386/243 |
| 8,417,790 | B2 * | 4/2013 | Shirakawa et al. ........... | 709/217 |
| 2007/0279511 | A1 * | 12/2007 | Misawa .................... | 348/333.06 |
| 2008/0081664 | A1 * | 4/2008 | Azada et al. .................. | 455/557 |
| 2009/0224955 | A1 * | 9/2009 | Bates et al. ................... | 341/175 |
| 2011/0099524 | A1 * | 4/2011 | Jeong et al. .................... | 715/843 |

FOREIGN PATENT DOCUMENTS

JP          2008092208 A       4/2008

* cited by examiner

*Primary Examiner* — Shawn An
(74) *Attorney, Agent, or Firm* — Lerner, David, Littenberg, Krumholz & Mentlik, LLP (57) ABSTRACT

A display device includes: a display section displaying a stereoscopic video image; and a display control section performing a control to allow the display section to display a plurality of menu screens including a first menu screen and a second menu screen with different stereoscopic effects. The first menu screen is provided for each of one or more video devices connected to the display device, and the second menu screen is provided for the display device.

14 Claims, 8 Drawing Sheets

| PHYSICAL ADDRESS | LOGICAL ADDRESS | OSD STEREOSCOPIC EFFECT VALUE |
|---|---|---|
| 0.0.0.0 | TV | 5 |
| 1.0.0.0 | AMP1 | 3 |
| 1.1.0.0 | Recorder1 | 1 |
| 2.0.0.0 | Recorder2 | 3 |

| PHYSICAL ADDRESS | LOGICAL ADDRESS | OSD STEREOSCOPIC EFFECT VALUE |
|---|---|---|
| 0.0.0.0 | TV | 5→1 |
| 1.0.0.0 | AMP1 | 3→5 |
| 1.1.0.0 | Recorder1 | 1→3 |
| 2.0.0.0 | Recorder2 | 3 |

FIG. 10B

| PHYSICAL ADDRESS | LOGICAL ADDRESS | OSD STEREOSCOPIC EFFECT VALUE |
|---|---|---|
| 0.0.0.0 | TV | 5→3 |
| 1.0.0.0 | AMP1 | 3→1 |
| 1.1.0.0 | Recorder1 | 1→5 |
| 2.0.0.0 | Recorder2 | 3 |

DISPLAY DEVICE, VIDEO DEVICE, MENU-SCREEN DISPLAY METHOD, AND VIDEO DISPLAY SYSTEM

CROSS-REFERENCE TO RELATED APPLICATION

The present application claims priority from Japanese Patent Application No. JP 2010-124310 filed in the Japanese Patent Office on May 31, 2010, the entire content of which is incorporated herein by reference.

BACKGROUND

This disclosure relates to a display device and a video device capable of generating a menu screen by OSD (On-Screen Display), a video display system including the display device and the video display device, and a method for displaying a menu screen applied to such video display system.

In recent years, with the widespread use of a flat television receiver, a link function facilitating and smoothing cooperation of the television receiver (display device) with an external device (video device) such as a recording and reproducing device has been promoted and enhanced. In particular, recording and saving the data of a high-definition television broadcast, with keeping high image quality thereof as it is, is becoming common because of the spread of Blu-ray Disc (Registered Trade Mark) recorders in recent years. The link function may be an appropriate function for facilitating such recording and saving.

While the above link function has different names depending on manufacturers, a basic standard of those is High Definition Multimedia Interface-Consumer Electronics Control (HDMI-CEC) that utilizes HDMI (Registered Trade Mark). HDMI-CEC allows a control signal conforming to a CEC protocol to be transmitted via a HDMI cable so as to achieve an operation for cooperating between devices. Thus, released from troublesome shifting or handling of remote controllers from one hand to the other and from complicated button operation, a user may enjoy a video image and a sound by operating simply.

The HDMI-CEC standard includes a basic inter-device control function using a common command unified among manufacturers and a specific inter-device control function using a unique command developed freely by manufacturers. The unique command for different functions is proposed by each manufacturer.

On the other hand, recently the setting of an electronic device employing a method using On-Screen Display (OSD) has been in widespread use as an electronic device obtains high functionality. Thus for the display device and the video device, the method is also becoming common. The method puts a user-friendly device setup in practice by displaying a menu screen on a display device and configuring the setting for devices in accordance with the displayed menu screen. The method further allows a user to carry out many kinds of setup by using only a basic button such as an up/down/left/right button and a select button.

Regarding the technique for controlling the menu screen with the HDMI-CEC, various approaches are provided. For example, Japanese Unexamined Patent Application Publication No. 2008-92208 discloses a technique for a menu display of a video device and a display device. This technique is adapted, when the video device instructs menu display, for transmitting a control signal through the HDMI-CEC between the video device and the display device, and thus displaying the menu screen of the video device, with an input selection of the display device conformed to the video device.

SUMMARY

When a display device and a video device are respectively operated with remote controllers, the same number of remote controller as the devices may be necessary to operate and it may be inconvenient. Thus, it is desirable to operate plural devices by using one remote controller in which buttons are arranged so as to operate plural devices. In this case, for example, a method may be contemplated in which a display device receives a control signal from a remote controller and the control signal is transmitted using a HDMI-CEC function to a subject video device to be operated.

In the method, buttons for operating plural devices are arranged in the remote controller. However the number of buttons to be arranged on the remote controller is limited because of size, design or the like in the remote controller, and thus it is difficult to arrange many buttons. To address this, for example, it is possible to reduce the number of buttons to some extent by sharing buttons such as an up/down/left/right button, a home button, an optional button, and a select button that are used for many display devices and many video devices. However, in this case, when operating a menu screen based on the OSD, it is necessary to operate the shared buttons by displaying the menu screen of the device to be operated after the selection of the device to be operated, and alternatively determining the shared buttons used for a given device. When selecting the device to be operated, a user have to be aware of the device any time because it is necessary to display a list of video devices connected to a display device and thereby the device to be operated is selected among the listed devices, which is not necessarily intuitive and easy to use.

Recently, a display device capable of realizing a stereoscopic viewing is attracting attention. Regarding such display device, a specific method for displaying a menu screen with OSD has not been proposed.

It is desirable to provide a display device, a video device, a menu-screen display method, and a video display system, capable of intuitively selecting a menu screen for a device to be operated.

A display device according to an embodiment of the present disclosure includes: a display section displaying a stereoscopic video image; and a display control section performing a control to allow the display section to display a plurality of menu screens including a first menu screen and a second menu screen with different stereoscopic effects. The first menu screen is provided for each of one or more video devices connected to the display device, and the second menu screen is provided for the display device.

A video device according to an embodiment of the present disclosure includes: a receiving section receiving a menu-information request signal from a display device which is configured to display a first menu screen for the video device and a second menu screen for the display device with different stereoscopic effects; and a transmitting section transmitting menu information to the display device.

A menu-screen display method according to an embodiment of the present disclosure includes: displaying, on a display section, a plurality of menu screens including a first menu screen and a second menu screen with different stereoscopic effects, the first menu screen being provided for each of one or more video devices, and the second menu screen being provided for a display device; receiving a selection operation for selecting any one menu from the plurality of menu screens; and displaying the selected menu screen together with a signification which shows that the menu screen on display is currently selected.

A video display system according to an embodiment of the present disclosure includes: a display device; and one or more video devices connected to the display device. The display device includes: a display section displaying a stereoscopic video image; and a display control section performing a control to allow the display section to display a plurality of menu screens including a first menu screen and a second menu screen with different stereoscopic effects, in which the first menu screen is provided for each of the one or more video devices, and the second menu screen is provided for the display device. The video device includes: a receiving section receiving a menu-information request signal from the video devices; and a transmitting section transmitting menu information to the video devices.

In the display device, the video device, the menu-screen display method, and the video display system according to the embodiments of the present disclosure, the plurality of menu screens including the first menu and the second menu with different stereoscopic effects with respect of each other are displayed stereoscopically at the same time. A user selects, based on a magnitude of the stereoscopic effect thereof, a menu screen from the plurality of menu screens displayed.

According to a display device of an embodiment, advantageously, the display control section receives a selection operation for selecting any one menu from the plurality of menu screens, and allows the display section to display the selected menu screen together with a signification which shows that the menu screen on display is currently selected.

Advantageously, the display device further includes a menu-screen generating section generating at least the second menu screen.

Advantageously, the display device further includes: a transmitting section transmitting a menu-information request signal to the video devices; and a receiving section receiving menu information from the video devices.

Advantageously, the menu information is image data configuring the first menu screen.

Advantageously, the display device further includes a device information holding section holding device information which includes a device address of each of the display device and the video devices and includes a stereoscopic effect value of each of the plurality of menu screens. The menu-screen generating section generates the plurality of menu screens, based on the device information.

Advantageously, the transmitting section transmits the menu-information request signal to the video device, based on the device information.

Advantageously, the control section selects another menu screen with second largest or second smallest stereoscopic effect from the plurality of menu screens, each time the display control section receives a menu-screen selection signal from a remote controller.

Advantageously, the control section selects the menu screen with largest stereoscopic effect by cyclically exchanging stereoscopic effect of each of the plurality of menu screens, each time the display control section receives the menu-screen selection signal from a remote controller.

Advantageously, the menu screen is superimposed on video information.

According to a video device of an embodiment, advantageously, the video device further includes a menu-screen generating section generating the first menu screen for the video device, and the transmitting section transmits image data configuring the first menu screen for the video device as the menu information.

Since the display device, the video device, the menu-screen display method, and the video display system according to the embodiments of the present disclosure are configured so as to display the plurality of menu screens including the first menu and the second menu with different stereoscopic effects with respect of each other, a user may intuitively select the menu screen of the device to be operated based on a magnitude of the stereoscopic effect of the device.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

Hereinafter, some embodiments of the present disclosure will be described in detail with reference to the accompanying drawings. The description will be given in the order below:
1. A first embodiment; and
2. A second embodiment.

1. First Embodiment

Configuration Example

Entire Configuration Example

Figure 1:
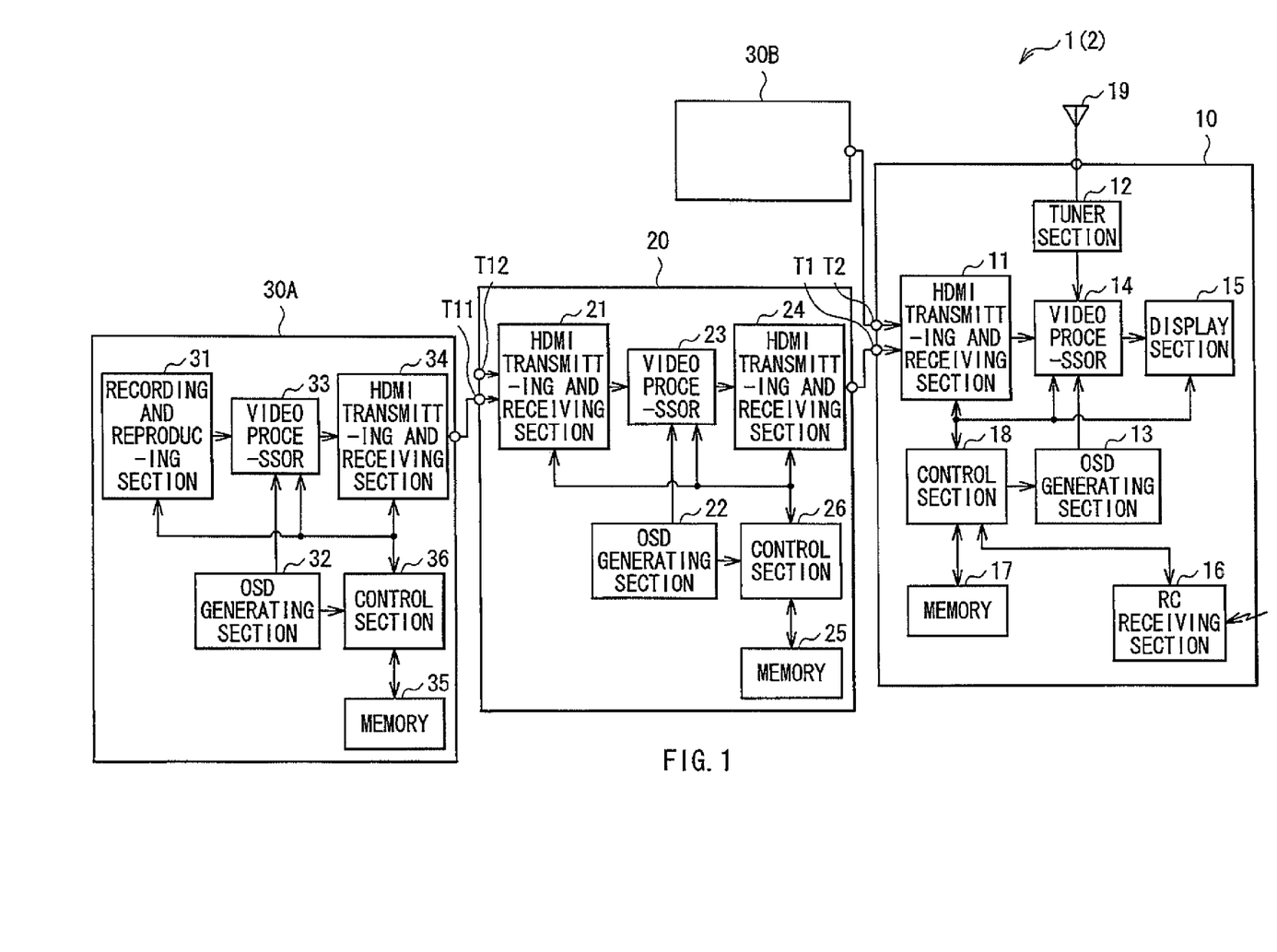
FIG. 1 is a block diagram illustrating a configuration example of a video display system according to a first embodiment of the present disclosure.

FIG. 1 shows a configuration example of a video display system according to the first embodiment of the present disclosure. Since a display device, a video device, and a menu-screen display method according to embodiments of the present disclosure are embodied in the embodiment, these also will be described below.

A video display system 1 includes a display unit 10, an amplifier 20, and video recording and reproducing units 30A and 30B, although the video display system is not limited to this configuration. The video display system may have a reproducing unit, a video camera, an external tuner or the like as a substitute for or in addition to the amplifier 20 and the video recording and reproducing units 30A and 30B. Hereinafter, the amplifier 20, the video recording and reproducing units 30A and 30B, and the like will be collectively referred to as a "video unit" suitably.

(Display Unit 10)

The display unit 10 is a stereoscopic display unit to superimpose a stereoscopic menu screen based on OSD (On-Screen Display) on a video information. The display unit includes terminals T1 and T2, a HDMI transmitting and receiving section 11, a tuner section 12, an OSD generating section 13, a video processor 14, a display section 15, a remote control (RC) receiving section 16, a memory 17, and a control section 18.

The terminals T1 and T2 are each configured by a connector compliant with the HDMI standard. The terminals T1 and T2 are connected to the amplifier 20 and the video recording and reproducing unit 30B as video units respectively. As will be discussed in more detail below, the video units connected to the terminal T1 or T2 are adapted for having allocated physical addresses corresponding to the terminal T1 or T2. In this example, the display unit 10 includes two terminals T1 and T2. However, there is no limitation to this, and thus the number of terminals may be one and alternatively three or more.

The HDMI transmitting and receiving section 11 receives video signals from the amplifier 20 connected to the HDMI transmitting and receiving section 11 via the terminal T1 and from the video recording and reproducing unit 30B connected to the HDMI transmitting and receiving section 11 via the terminal T2, and further communicates a CEC control signal for a cooperative operation among these video units. As will be discussed below, the received video signal includes video information on the stereoscopic menu screen of the video units. The HDMI transmitting and receiving section 11 is adapted for selecting either of the received video signals via the terminals T1 and T2, and supplying the selected video signal to the video processor 14. The CEC control signal is used when the amplifier 20 and the video recording and reproducing unit 30B respectively acquire logical addresses or when the display unit 10 requests these video units to generate menu screens, as will be discussed below.

The tuner section 12 performs a predetermined reception process or a decoding process to a broadcast wave received with an antenna 19, and thereby restores and generates a video signal, an audio signal, and the like, and supplies the video signal to the video processor 14.

The OSD generating section 13 serves for generating a menu screen, which is superimposed on the video information to be displayed, in order to configure various settings of the display unit 10 or to operate the display unit 10. The menu screen is displayed as a stereoscopic image on the display section as will be described below. That is, the OSD generating section 13 generates a menu screen configured of a left eye image and a right eye image each having a disparity between the two images. In the generation, as will be discussed below, the OSD generating section 13 is adapted for configuring the setting for the disparity based on an OSD stereoscopic effect value of the display unit 10 included in a unit information management table TA.

The video processor 14 performs some video processing or some controls to display a video image on the display section 15 based on the supplied video signal by the tuner section 12, the HDMI transmitting and receiving section 11, and the OSD generating section 13. More specifically, the video processor 14 selects either of the video signal supplied by the tuner section 12 and the video signal supplied by the HDMI transmitting and receiving section 11 to superimpose the menu screen supplied by the OSD generating section 13 on the selected video information, and subsequently performs video processing such as a gamma processing. The video processor 14 is adapted for supplying the left eye image and the right eye image, having respectively a disparity and generated by these processing, to the display section 15.

The display section 15 performs stereoscopic display based on the supplied signal by the video processor 14.

Figure 2A:
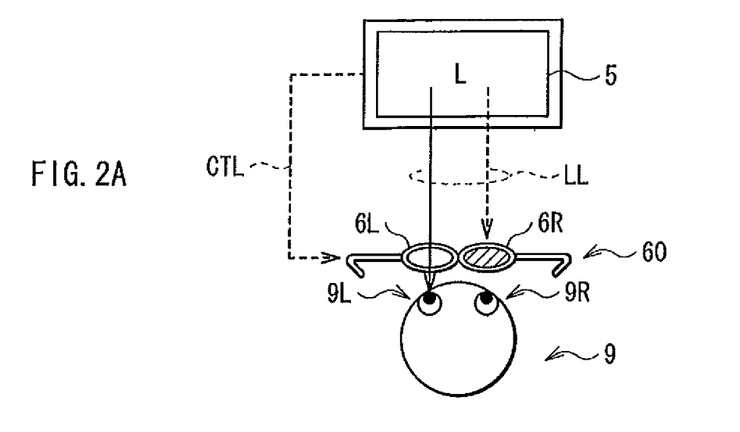
FIGS. 2A and 2B are diagrams explaining a configuration example and an operation example of a display section according to the first embodiment.
Figure 2B:
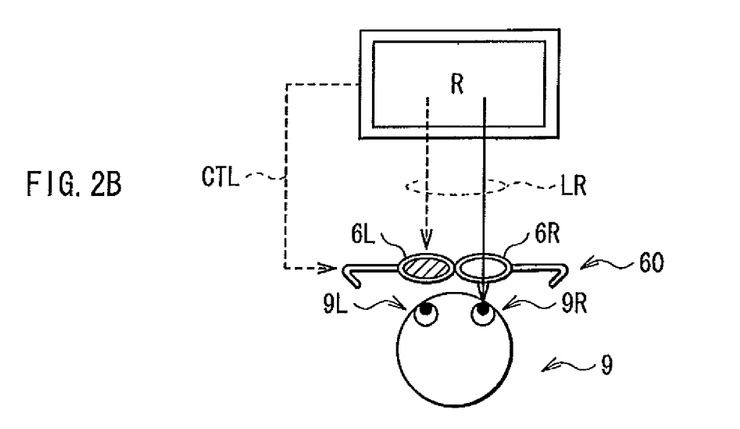

FIGS. 2A and 2B each illustrate a configuration example and an operation example of the display section 15. The display section 15 includes a display device 5. The display device 5 includes, for example, a liquid crystal display panel and alternately displays the left eye image L and the right eye image R in time-division. When a viewer 9 watches the left eye image L and the right eye image R displayed on the display device 5 through shutter glasses 60, the viewer 9 may recognize these images as a stereoscopic video image. The shutter glasses 60 are a glasses-shaped shutter device worn by the viewer 9 and have a left eye shutter 6L and a right eye shutter 6R. The left eye shutter 6L and the right eye shutter 6R include, for example, a light-blocking shutter such as a liquid-crystal shutter. The light blocking states (open state and closed state) of the left eye shutter 6L and the right eye shutter 6R is adapted for being controlled by a shutter control signal CTL supplied by a shutter control section (not shown) included in the display section 15.

In FIGS. 2A and 2B, FIG. 2A illustrates an operation in the display of the left eye image L, and FIG. 2B illustrates an operation in the display of the right eye image R. When the display device 5 displays the left eye image L, in the shutter glasses 60, the left eye shutter 6L is in the open state and the right eye shutter 6R is in the closed state as shown in FIG. 2A. In this case, the viewer 9 may watch the left eye image L with his/her left eye 9L. On the other hand, when the display device 5 displays the right eye image R, in the shutter glasses 60, the left eye shutter 6L is in the closed state and the right eye shutter 6R is in the open state as shown in FIG. 2B. In this case, the viewer 9 may watch the right eye image R with his/her right eye 9R. Because of a disparity between the left eye image L and the right eye image R, repetition of these operations in time-division allows the viewer 9 to recognize a video image configured of a series of these images as a stereoscopic video image having a depth.

The RC receiving section 16 serves for receiving a remote control signal from a remote control unit 40 (to be discussed below) to transmit the remote control signal to the control section 18.

Figure 3:
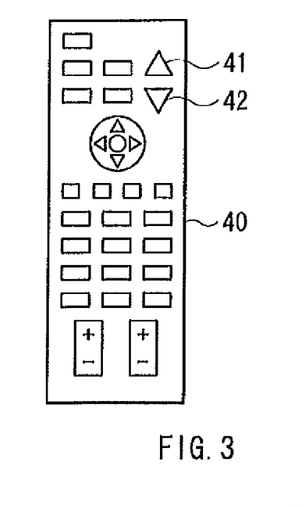
FIG. 3 is a plan view illustrating a configuration example of a remote control unit according to the first embodiment.

FIG. 3 illustrates a configuration example of the remote control unit 40. The remote control unit 40 is employed for performing operations of the display unit 10 and the video units connected to the display unit 10 (the amplifier 20 and the video recording and reproducing units 30 A and 30B). The remote control unit 40 has a back button 41 and a front button 42. The back button 41 and the front button 42, as will be discussed below, are employed for selecting a menu screen to be operated from the stereoscopic menu screens of plural units displayed on the display section with different OSD stereoscopic effects with respect to each other, based on such stereoscopic effects. The remote control unit 40 is adapted for, as the back button 41 or the front button 42 is pressed, transmitting a menu-screen selection signal corresponding to the back button 41 and the front button 42 to the display unit 10. As a method for concurrently displaying plural menu screens, a user may press, for example, the back button 41 or the front button 42, or the other button (for example, an option button) which is different from the back button 41 or the front button 42. At this time, the remote control unit 40 transmits a menu-screen display request signal to the display unit 10. Alternatively, plural menu screens may be concurrently displayed by pressing, for example, an individual button, arranged in the remote control unit 40, corresponding to each of the units to separately display the menu screens.

The memory 17 serves for storing information necessary to perform various processing of the display unit 10. More specifically, as will be discussed below, the memory 17, for example, stores the unit information management table TA for managing the display unit 10 and the video units (the amplifier 20, and the video recording and reproducing units 30A and 30B) connected to the display unit 10. The memory 17 further is adapted for, when the stereoscopic menu screens of plural units are displayed on the display unit 15, storing an OSD stereoscopic effect value of the operable menu screen currently selected, as will be discussed below.

The control section 18 serves for controlling the coordinate operations among the HDMI transmitting and receiving section 11, the OSD generating section 13, the video processor 14, the display section 15, the RC receiving section 16, and the memory 17. The control section 18 further serves for controlling circuit blocks thereof based on a CEC control signal received in the HDMI transmitting and receiving section 11, to generate a CEC control signal employed for controlling the video units (the amplifier 20 and the video recording and reproducing units 30A and 30B).

(Video Recording and Reproducing Units 30A and 30B and Amplifier 20)

The video recording and reproducing unit 30A is, for example, a DVD (Registered Trade Mark) recorder, a Blu-ray Disc (Registered Trade Mark) recorder, or the like and reproduces video information to output the same. Since the video recording and reproducing unit 30B has a similar configuration to the video recording and reproducing unit 30A thereof, only the video recording and reproducing unit 30A will be described herein.

The video recording and reproducing unit 30A includes a recording and reproducing section 31, an OSD generating section 32, a video processor 33, a HDMI transmitting and receiving section 34, a memory 35, and a control section 36.

The recording and reproducing section 31 is a recording drive such as a DVD (Registered Trade Mark), a Blu-ray Disc (Registered Trade Mark), and a hard disk and serves for recording video information or reproducing recorded video information.

The OSD generating section 32 serves for generating the stereoscopic menu screen, which is superimposed on the video information to be displayed, in order to configure the various settings for the video recording and reproducing unit 30A or to control the operation of the video recording and reproducing unit 30A, as with the video processor 14 of the display unit 10. At this time, the OSD generating section 32 is adapted for setting a disparity based on the OSD stereoscopic effect value allocated and stored in the memory 35 as will be discussed below.

The video processor 33 performs various video processing or controls of the video signal supplied by the recording and reproducing section 31 and the OSD generating section 32. More specifically, the video processor 33 is adapted for superimposing the menu screen supplied by the OSD generating section 32 on the video information supplied by the recording and reproducing section 31 and further performing predetermined video processing.

The HDMI transmitting and receiving section 34 transmits the video information including the stereoscopic menu screen supplied by the video processor 33 to the display unit 10 via the amplifier 20 and further communicates the CEC control signal between the amplifier 20 and the display unit 10 so as to allow coordinate operation between the devices.

The memory 35 stores information necessary to perform various processing of the video recording and reproducing unit 30A. More specifically, the memory 35 is adapted for storing, for example, a physical address, a logical address, and an OSD stereoscopic effect value (will be discussed below), and the like of the video recording and reproducing unit 30A.

The control section 36 serves for controlling coordinate operation among the recording and reproducing section 31, the OSD generating section 32, the video processor 33, the HDMI transmitting and receiving section 34, the memory 35, and the control section 36. The control section 36 further serves for controlling circuit blocks thereof based on the received CEC control signal by the HDMI transmitting and receiving section 34 and for generating the CEC control signal for controlling operations of the amplifier 20 and the display unit 10.

The amplifier 20 is a so-called audio visual amplifier used in, for example, a home theater and the like and is capable of inputting and outputting a video signal and serves as the input selector for the input video signal. The amplifier 20 includes terminals T11 and T12, a HDMI transmitting and receiving section 21, an OSD generating section 22, a video processor 23, a HDMI transmitting and receiving section 24, a memory 25, and a control section 26.

The terminals T11 and T12 are configured by a connector compliant with the HDMI standard, as with the terminals T1 and T2 of the display unit 10. In the exemplary embodiment, only the terminal T11 is connected to the video recording and reproducing unit 30A as the video unit. As will be discussed in more detail hereinafter, to the video recording and reproducing unit 30A connected to the terminal T11, a physical address corresponding to the terminal T11 is allocated. In this example, the terminal T12 is not connected to the video unit. However, there is no limitation to this, and the terminal T12 may be connected to a video unit such as the video recording and reproducing unit.

The HDMI transmitting and receiving section 21 receives a video signal from the video recording and reproducing unit 30A connected to the HDMI transmitting and receiving section 21 via the terminal T11, and further communicates the CEC control signal with the video recording and reproducing unit 30A for coordinate operation between the devices, as with the HDMI transmitting and receiving section 11 of the display unit 10. The received video signal includes video information on a stereoscopic menu screen of the video recording and reproducing unit 30A. The HDMI transmitting and receiving section 21 is adapted for selecting either of video signals received respectively via the terminals T11 and T12 to supply the selected video signal to the video processor 23.

The OSD generating section 22, the video processor 23, the HDMI transmitting and receiving section 24, the memory 25, and the control section 26 have functions similar to those of the corresponding block of the video recording and reproducing unit 30A. That is, the OSD generating section 22 serves for generating a stereoscopic menu screen, which is superimposed on the video information to be displayed, based on the OSD stereoscopic effect value allocated and stored in the memory 25. The video processor 23 superimposes the menu screen supplied by the OSD generating section 22 on the video information supplied by the HDMI transmitting and receiving section 21 and further performs a predetermined video processing. The HDMI transmitting and receiving section 24 transmits the video information including the stereoscopic menu screen supplied by the video processor 23 to the display unit 10, and further communicates the CEC control signal between the display unit 10 and the transmitting and receiving section 24 to coordinate between the devices. The memory 25 stores information necessary to perform various processing of the amplifier 20, i.e. information such as on a physical address, a logical address, an OSD stereoscopic effect value, and the like relevant to the amplifier 20. The control section 26 serves for controlling the coordination among the HDMI transmitting and receiving sections 21 and 24, the OSD generating section 22, the video processor 23, the memory 25, and the control section 26. The control section 26 further serves for controlling the circuit blocks thereof based on the CEC control signals respectively received by the HDMI transmitting and receiving sections 21 and 24, to generate the CEC control signal used for control of the video recording and reproducing unit 30A and the display unit 10.

(Unit Information Management Table TA)

Figure 4:
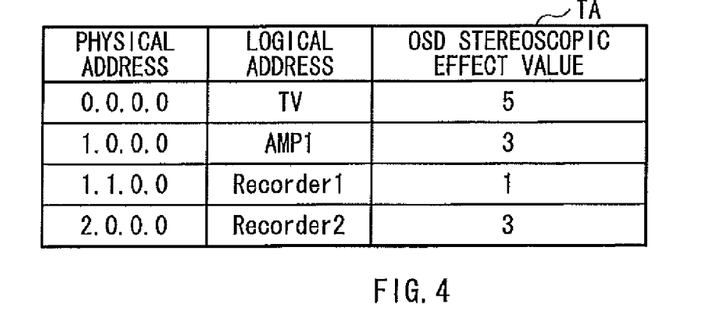
FIG. 4 is a table illustrating a configuration example of a device information control table according to the first embodiment.

FIG. 4 shows the unit information management table TA. The unit information management table TA is stored in the memory 17 of the display unit 10 and indicates unit information on the display unit 10 and the video units configuring the video display system 1. The unit information management table TA includes each of physical addresses, logical addresses and OSD stereoscopic effect values for the units. Hereinafter, these will be discussed in detail in reference with a specific example of connection among the units.

Figure 5:
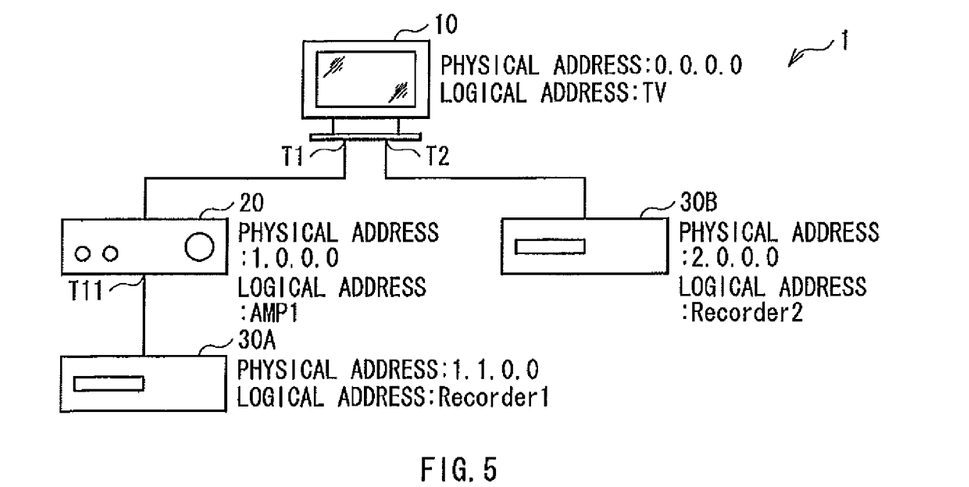
FIG. 5 is a diagram explaining an example of a connection between a display device and a video device according to the first embodiment.

FIG. 5 shows an example of a connection among the units of the video display system 1. The example of the connection shown in FIG. 5 corresponds to the configuration example of the video display system 1 shown in FIG. 1.

The physical address identifies each of the units connected to the video display system 1. The physical address of each of the units is adapted to be the address where the unit is allocated to the physical address corresponding to the terminal of the upper unit connected to the unit. More specifically, the physical address allocated to the amplifier connected to the terminal T1 of the display unit 10 is (1.0.0.0), and the physical address allocated to the video recording and reproducing unit 30B connected to the terminal T2 is (2.0.0.0). Namely, the first digit in the physical address corresponds to the terminal T1 or T2 of the display unit 10. Further, the physical address allocated to the video recording and reproducing unit 30A connected to the terminal T11 of the amplifier 20 is (1.1.0.0). Namely, the first digit in the physical address corresponds to the terminal T1 of the display unit 10 and further the second digit corresponds to the terminal T11 of the amplifier 20. The physical address allocated to the display unit 10 is (0.0.0.0). The unit information management table TA is adapted for recording the physical address allocated in this manner to each unit.

The logical address is for identifying the kind of each unit connected to the video display system 1. That is, the logical address corresponds to the kind of the unit and allocated to the unit when the unit is connected to the video display system 1. In particular, first, when the amplifier 20 is connected to the video display system having only the display unit 10 via the terminal T1 of the display unit 10, the amplifier 20 inquires whether "AMP1", representing the addition of "1" to the kind of own unit (i.e., AMP), has been already used as a logical address of the video display system by using the CEC control signal. In this case, since "AMP1" is not used in the video display system as a logical address, the logical address "AMP1" is allocated to the amplifier 20. Next, when the video recording and reproducing unit 30A is connected to the video display system having the display unit 10 and the amplifier 20 via the terminal T11 of the amplifier 20, the logical address, "Recorder1", representing the addition of "1" to the kind of own unit (i.e. "Recorder"), is allocated to the video recording and reproducing unit 30A, in the same way as the connection of the amplifier 20. Next, when the video recording and reproducing unit 30B is connected to the video display system having the display unit 10, the amplifier 20, and the video recording and reproducing unit 30A via the terminal T2 of the display unit 10, the video recording and reproducing unit 30B inquires whether "Recorder1", representing the addition of "1" to the kind of own unit (i.e. "Recorder"), has been already used as a logical address of the video display system by using the CEC control signal. In this case, "Recorder1" as the logical address has been already allocated to the video recording and reproducing unit 30A. Thus, upon the reception of the response as to the use of "Recorder1", the video recording and reproducing unit 30B inquires whether "Recorder2", representing the addition of "2" to the kind of own unit (i.e. "Recorder"), has been already used as a logical address of the video display system by using a CEC control signal. In this case, since "Recorder2" is not used as a logical address in the video display system, the logical address "Recorder2" is allocated to the video recording and reproducing unit 30B. The unit information management table TA is adapted for recording the logical address allocated in the above manner to each unit.

The OSD stereoscopic effect represents a magnitude in which the menu screen is seen stereoscopically. The magnitude represented by the OSD stereoscopic effect is used in the generation of the stereoscopic menu screen based on the OSD by each unit. In the exemplary embodiment, the OSD stereoscopic effect is so adapted that the larger a numeric value of the OSD stereoscopic effect is, the more the menu screen is displayed on the front side. The display unit 10 and all video units connected directly or indirectly to a terminal selected as an input terminal of the display unit 10 may respectively have different OSD stereoscopic effects from each other. For example, in the connection example in the video display system 1 shown in FIG. 5, when the terminal T1 of the display unit 10 is selected as an input terminal, each of the OSD stereoscopic effects of the display unit 10, the amplifier 20, and the video recording and reproducing unit 30A may differ among these units. Thus, as will be discussed below, when the stereoscopic menu screens of the display unit 10, the amplifier 20, and the video recording and reproducing unit 30A are concurrently displayed on the display unit 10, a user may intuitively recognize that these menu screens respectively corresponds to different units because of the difference in the OSD stereoscopic effects.

Allocation of the OSD stereoscopic effect may be performed, for example, by the inquiry to the video display system with the CEC control signal in the same way as the allocation of the logical address discussed above, when a given unit is connected to the video display system. The unit information management table TA is adapted for recording each of the OSD stereoscopic effects of the thus-allocated units.

In the display unit 10 having the above configuration, when plural stereoscopic menu screens with different OSD stereoscopic effects with respect to each other are displayed, the control section 18 selects, based on the menu-screen selection signal supplied by the remote control unit 40, a menu screen by using the OSD stereoscopic effect value of the unit information management table TA, as will be discussed below. Subsequently, the control section 18 and the HDMI transmitting and receiving section 11 generate the CEC control signal for displaying the selected menu screen in an emphasized manner to transmits the CEC control signal to the unit (for example the amplifier 20) corresponding to the selected menu screen. Upon the reception of the CEC control signal in the amplifier 20, the OSD generating section 22 generates the menu screen to be displayed in an emphasized manner. Thus, the display unit 10 is so adapted that the menu screen, selected by a user, of the amplifier 20 from the stereoscopic menu screens of plural units is displayed in an emphasized manner.

Herein, the display unit 10 corresponds to a specific example of the "display device" according to the embodiment of the present disclosure. The OSD stereoscopic effect corresponds to a specific example of the "stereoscopic effect" according to the embodiment of the present disclosure. The control section 18 corresponds to a specific example of the "display control section" according to the embodiment of the present disclosure. The OSD generating section 13 corresponds to the "menu-screen generating section" of the display device according to the embodiment of the present disclosure. The HDMI transmitting and receiving section 11 corresponds to a specific example of the "transmitting section" and the "receiving section" of the display device according to the embodiment of the present disclosure. The physical address and the logical address correspond to a specific example of the "device address" according to the embodiment of the present disclosure. The unit information management table TA corresponds to a specific example of the "device information" according to the embodiment of the present disclosure. The memory 17 corresponds to a specific example of the "device information holding section" according to the embodiment of the present disclosure. The remote control unit 40 corresponds to a specific example of the "remote controller" according to the embodiment of the present disclosure.

The amplifier 20 and the video recording and reproducing unit 30A respectively correspond to specific examples of the "video device" according to the embodiment of the present disclosure. The HDMI transmitting and receiving sections 21, 24, and 34 respectively correspond to a specific example of the "transmitting section" and the "receiving section" according to the embodiment of the present disclosure. The OSD generating sections 22 and 32 respectively correspond to a specific example of the "menu-screen generating section" of the video device according to the embodiment of the present disclosure.

[Operation and Effect]

An operation and an effect of the video display system 1 of the present embodiment will now be discussed.

(Overview of Entire Operation)

First, the entire operation of the video display system 1 will be discussed. As an example of the entire operation, a case where the video recording and reproducing unit 30A reproduces the video information and thereby the display unit 10 displays the reproduced video information will be discussed.

First, in the video recording and reproducing unit 30A, the recording and reproducing section 31 reproduces the video information. The OSD generating section 32 generates a stereoscopic menu screen based on the OSD stereoscopic effect value stored in the memory 35 and allocated to the video recording and reproducing unit 30A. The video processor 33 superimposes the supplied menu screen by the OSD generating section 32 on the video information supplied by the recording and reproducing section 31, and performs a predetermined video processing. The HDMI transmitting and receiving section 34 transmits the video information including the supplied stereoscopic menu screen by the video processor 33 to the amplifier 20. The control section 36 controls so that these blocks may operate in coordination.

In the amplifier 20, the HDMI transmitting and receiving section 21 receives the video information supplied by the video recording and reproducing unit 30A. The OSD generating section 22 generates a stereoscopic menu screen based on the OSD stereoscopic effect value stored in the memory 25 and allocated to the amplifier 20. The video processor 23 superimposes the supplied menu screen by the OSD generating section 22 on the video information supplied by the HDMI transmitting and receiving section 21, and performs a predetermined video processing. The HDMI transmitting and receiving section 24 transmits the video information including the supplied stereoscopic menu screen by the video processor 23 to the display unit 10. The control section 26 controls so that these blocks may operate in coordination.

In the display unit 10, the HDMI transmitting and receiving section 11 selectively receives the video information supplied by the amplifier 20. The OSD generating section 13 generates a stereoscopic menu screen based on the OSD stereoscopic effect value included in the unit information management table TA stored in the memory 17, and allocated to the display unit 10. The video processor 14 selects the video information supplied by the HDMI transmitting and receiving section 11 to superimpose the supplied menu screen by the OSD generating section 13 on the video information, and performs a predetermined video processing. The display section 15 performs stereoscopic display based on the signal supplied by the video processor 14. The RC receiving section 16 receives the remote control signal from the remote control unit 40 and transmits the remote control signal to the control section 18. The control section 18 controls so that these blocks may operate in coordination.

(Detailed Operation)

Figure 6:
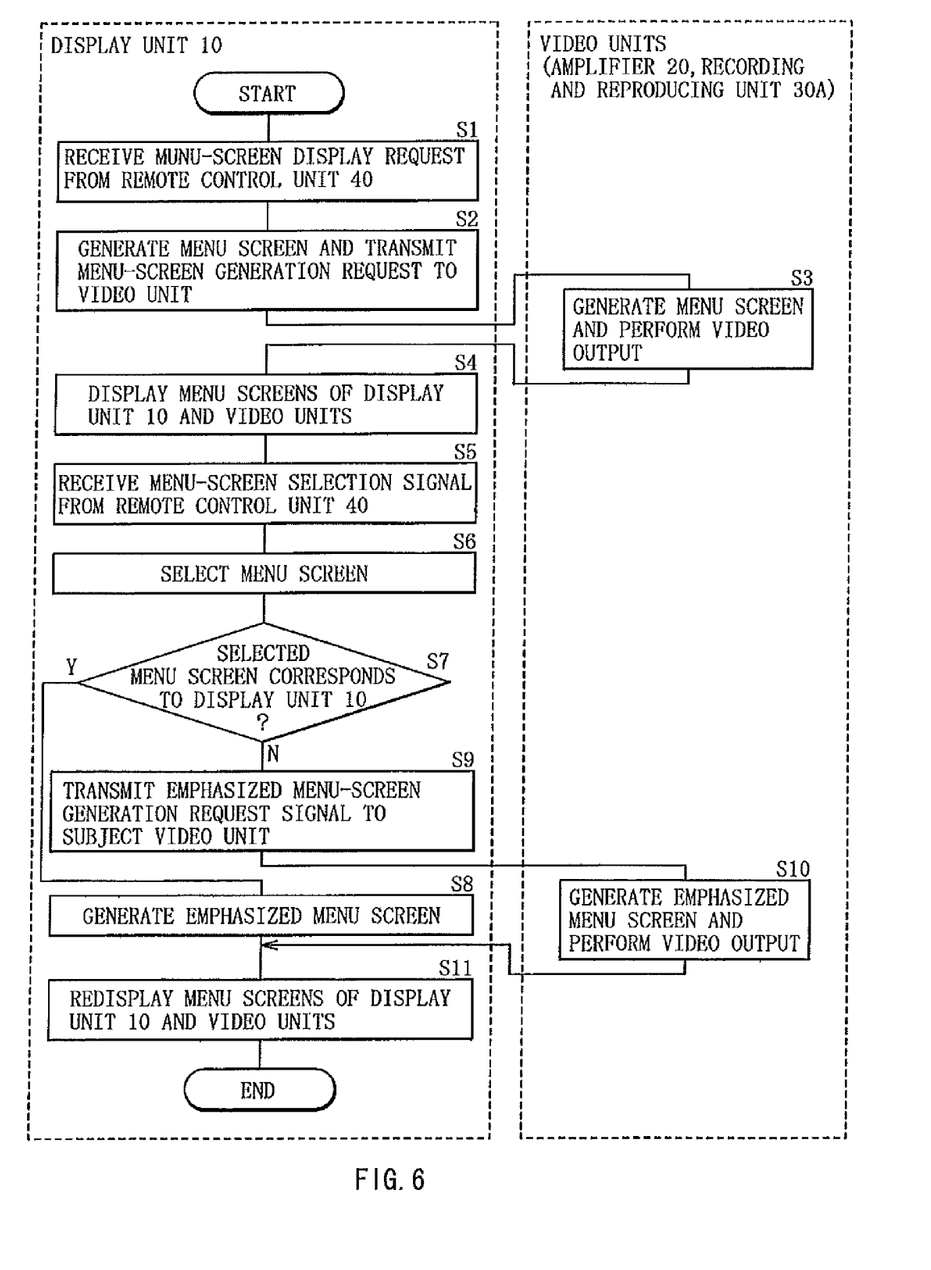
FIG. 6 is a flowchart illustrating an operation example of a video display system according to the first embodiment.

FIG. 6 shows a flowchart in the case where, after the display of plural menu screens in the video display system 1, the selection of a menu screen to be operated from those menu screens is performed. In the video display system 1, the display unit 10 displays the plural stereoscopic menu screens with different OSD stereoscopic effects with respect to each other, and thereby a user selects a menu screen, based on the OSD stereoscopic effect of each of the menu screens, with the remote control unit 40. Based on the operation by the user, the display unit 10 uses the OSD stereoscopic effect value to identify and select the menu screen, and performs an emphasis display of the selected menu screen. In this example, a physical address, a logical address, and an OSD stereoscopic value have already been allocated to each of the units. Thus, the unit information management table TA has already been generated and stored in the memory 17, and each memory of the units has stored the physical address, the logical address, and the OSD stereoscopic effect value allocated to the unit. Each of steps of the flow will be discussed in detail below.

First, the display unit 10 receives a menu-screen display request signal from the remote control unit 40 (step S1). More specifically, when the user presses, for example, the back button 41 or the front button 42 of the remote control unit 40, the remote control unit 40 transmits the menu-screen display request signal and thereby the RC receiving section 16 of the display unit 10 receives the menu-screen display request signal.

Next, the display unit 10 generates the menu screen and transmits the menu-screen generation request signal to the video units (step S2). More specifically, in the display unit 10, first the OSD generating section 13 generates the stereoscopic menu screen based on the OSD stereoscopic effect value included in the unit information management table TA stored in the memory 17 and allocated to the display unit 10. Further, the control section 18 generates the menu-screen generation request signal for all video units (the video recording and reproducing unit 30A and the amplifier 20) connected directly and indirectly to a terminal selected as an input terminal of the display unit 10 (for example the terminal T1), based on the unit information management table TA stored in the memory 17. Subsequently, the HDMI transmitting and receiving section 11 transmits the menu-screen generation request signal as the CEC control signal.

Next, the video recording and reproducing unit 30A and the amplifier 20 generate the menu screens to perform video output (step S3). More specifically, in the video recording and reproducing unit 30A, the OSD generating section 32 generates the stereoscopic menu screen based on the OSD stereoscopic effect value stored in the memory 35 and allocated to the video recording and reproducing unit 30A. Subsequently, the video processor 33 superimposes the menu screen on the video information supplied by the recording and reproducing section 31, and further the HDMI transmitting and receiving section 34 transmits such video information to the amplifier 20. Similarly, in the amplifier 20, the OSD generating section 22 generates the stereoscopic menu screen based on the OSD stereoscopic effect value stored in the memory 25 and allocated to the amplifier 20. The video processor 23 superimposes the menu screen on the video information supplied by the video recording and reproducing unit 30A via the HDMI transmitting and receiving section 21, and subsequently the HDMI transmitting and receiving section 24 transmits such video information to the display unit 10.

Next, the display unit 10 displays menu screens for the display unit 10 and the video units (step S4). More specifically, in the display unit 10, the video processor 14 superimposes the menu screen of the display unit 10 generated in the step S2, on the video information supplied via the HDMI transmitting and receiving section 11 by the amplifier 20, and subsequently the display section 15 displays such video information. Thus, in the display section 15, the menu screens for the units i.e. the video recording and reproducing unit 30A, the amplifier 20, and the display unit 10 with different stereoscopic effects with respect to each other may be concurrently displayed on the video information to be reproduced by the recording and reproducing section 31 of the video recording and reproducing unit 30A, respectively.

Figure 7A:
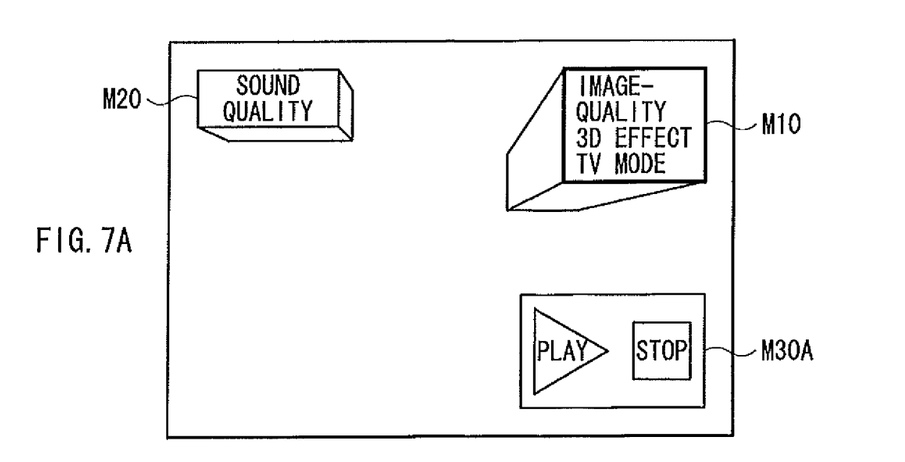
FIGS. 7A and 7B are diagrams explaining an operation example of the video display system according to the first embodiment.
Figure 7B:
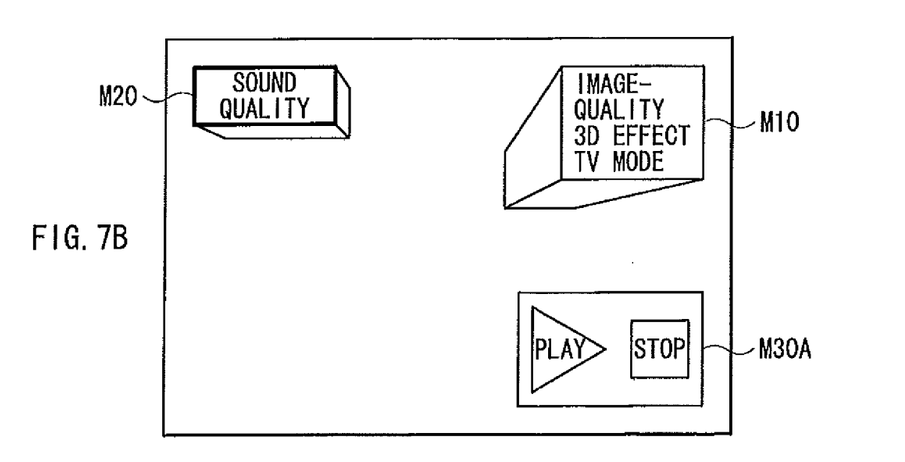

FIGS. 7A and 7B show a display example of the menu screen displayed in the display unit 10. FIG. 7A shows a case where a menu screen of the display unit 10 is selected, and FIG. 7B shows a case where a menu screen of the amplifier 20 is selected. As shown in FIGS. 7A and 7B, in the display unit 10, the menu screen M10 of the display unit 10, the menu screen M20 of the amplifier 20, and the menu screen M30A of the video recording and reproducing unit 30A are displayed. The menu screens M10, M20, and M30A are prospectively configured so that these menu screens are displayed without an overlap on the screen of the display unit 10. These menu screens M10, M20, and M30A are displayed based on the unit information management table TA shown in FIG. 4. That is, for example, since the display unit 10 (logical address: "TV")

has the OSD stereoscopic effect with numeric value "5", the menu screen M10 is displayed on the most-front side as shown in FIGS. 7A and 7B. On the other hand, for example, since the video recording and reproducing unit 30A (logical address: "Recorder1") has the OSD stereoscopic effect with numeric value "1", the menu screen M30A is displayed on the most-back side as shown in FIGS. 7A and 7B. In FIG. 7A, the menu screen M10 of the display unit 10 is displayed in an emphasize manner. The emphasis display of the menu screen M10 indicates that the menu screen M10 is currently selected and thus be operable.

Next, the display unit 10 receives the menu-screen selection signal from the remote control unit 40 (step S5). More specifically, upon press of the back button 41 or the front button 42 of the remote controller 40 by a user, the remote control unit 40 transmits the menu-screen selection signal to the RC receiving section 16 of the display unit 10 for receiving the menu-screen selection signal.

Next, the display unit 10 selects a menu screen based on the menu-screen selection signal (step S6). More specifically, the control section 18 of the display unit 10 selects the menu screen by identifying based on: the OSD stereoscopic effect value of the currently selected menu screen to be operable stored in the memory 17; the unit information management table TA stored in the memory 17; and the menu-screen selection signal received from the remote control unit 40 in the step S5. Thus, in the display unit 10, the selected menu screen may become operable.

As an example, a case where, among the menu screens displayed in the display unit 10, the menu screen M10 of the display unit 10 is selected (displayed in an emphasized manner) to be operable as shown in FIG. 7A will be discussed in detail. In this case, since the display unit 10 (logical address: "TV") has the OSD stereoscopic effect of the menu screen M10 with numeric value "5" as shown in FIG. 4, the memory 17 stores the OSD stereoscopic effect with numeric value "5". When a user manipulates the remote control unit 40 by pressing, for example, the back button 41, the control section 18 of the display unit 10 searches a menu screen having the second smallest OSD stereoscopic effect next to the menu-screen currently selected, from the three menu screens currently displayed of the display unit 10 (logical address: "TV"), the amplifier 20 (logical address: "AMP1"), and the video recording and reproducing unit 30A (logical address: "Recorder1"), using the unit information management table TA. That is, the control section 18 selects the menu screen M20 (OSD stereoscopic effect value: "3") having the second smallest OSD stereoscopic effect next to OSD stereoscopic effect with numeric value "5" in the menu screen M10 of the display unit 10.

On the other hand, when a user manipulates and presses the front button 42, the control section 18 of the display unit 10 searches a menu screen having the second largest OSD stereoscopic effect next to the menu-screen currently selected thereof in the three menu screens currently displayed to select the menu screen with the second largest OSD stereoscopic effect.

For example, in FIG. 7A, since the menu screen M10 in which the OSD stereoscopic effect is the largest of the three menu screens has already been selected, the menu screen having the second largest OSD stereoscopic effect next to the menu screen currently selected thereof may not be found by the control section 18 even if a user further press the front button 42. In this case, the control section 18 may be configured so as not to respond to such selection even if the front button 42 is pressed. Alternatively, the control section 18 may be configured so as to search the menu screen having the smallest OSD stereoscopic effect of the three menu screens currently displayed and thereby to select the found menu screen when the front button 42 is pressed in such case.

Next, the display unit 10 determines whether the selected menu screen corresponds to the display unit 10 (step S7). More specifically, the control section 18 of the display unit 10 determines whether the menu screen selected in step S6 corresponds to the display unit 10. If the menu screen corresponds to the display unit 10, the process proceeds to step S8. If the menu screen does not correspond to the display unit 10, the process proceeds to step S9.

In step S7, when the menu screen corresponds to the display unit 10, the display unit 10 generates the emphasized menu screen (step S8). More specifically, the OSD generating section 13 of the display unit 10 generates the emphasized menu screen by modifying color, border (frame line), and the like of the menu screen. The emphasis on the menu screen is not limited to static features such as color and border thickness. Thus, the emphasis may be dynamic features such as blinking display in the menu screen. Thereafter, the process proceeds to step S11.

In step S7, when the menu screen does not correspond to the display unit 10, the display unit 10 transmits an emphasized menu-screen generation request signal to the subject video unit (step S9). More specifically, the control section 18 of the display unit 10 generates the emphasized menu-screen generation request signal for instructing the video unit, which has generated the menu screen by the selection in step S6 (the amplifier 20 or the video recording and reproducing unit 30A), to generate an emphasized menu screen. Thus, the HDMI transmitting and receiving section 11 transmits the emphasized menu-screen generation request signal as the CEC control signal.

Next, the video unit generates the emphasized menu-screen to perform video output (step S10). More specifically, for example, when the transmission of the emphasized menu-screen generation request signal to the video recording and reproducing unit 30A is performed in step S9, the OSD generating section 32 of the video recording and reproducing unit 30A generates the emphasized menu screen. Subsequently, the video processor 33 generates video information by superimposing the emphasized menu screen on the video information supplied by the recording and reproducing section 31. The HDMI transmitting and receiving section 34 transmits the video information generated by the video processor 33 via the amplifier 20 to the display unit 10. Alternatively, for example, when the transmission of the emphasized menu-screen generation request signal to the amplifier 20 is performed in step S9, the OSD generating section 22 of the amplifier 20 generates the emphasized menu screen. Subsequently, the video processor 23 generates video information by superimposing the emphasized menu screen on the video information supplied by the HDMI transmitting and receiving section 21. The HDMI transmitting and receiving section 24 transmits video information generated by the video processor 23 to the display unit 10.

Next, the display unit 10 redisplays each of the menu screens of the display unit 10 and the video units (step S11). More specifically, the video processor 14 of the display unit 10 superimposes the menu screen of the display unit 10 on the video information supplied by the amplifier 20 via the HDMI transmitting and receiving section 11, and subsequently the display section 15 displays the video information superimposed by the video processor 14. Thereby, as shown in FIG. 7B, the different menu screen from the emphasized menu screen displayed in FIG. 7A may become an emphasized menu screen.

This ends the process in the flowchart shown in FIG. 6. After the completion of the process, a user may perform manipulation of the emphasized menu screen. More specifically, for example, when a user presses the up/down/left/right button on the remote control unit 40, the display unit 10 transmits the CEC control signal corresponding to the above manipulation to the display 10 or the video unit, which has generated the menu screen selected in step S6. Alternatively, if the selection of another menu screen is performed, the process may be returned to step S5 to manipulate the remote control unit 40 again.

In the video display system 1, when the operation of a menu screen based on the OSD is performed, first a user allows plural menu screens having different OSD stereoscopic effects from each other to be displayed, and selects the OSD stereoscopic effect by pressing the back button 41 or the front button 42 of the remote control unit 40, and thereby a menu screen is selected among the displayed menu screens. Accordingly, as compared with a case in which a selection is performed from a list showing the display unit or the video units, a user may more-intuitively select a menu screen for operating.

For example, when reproducing is initiated in the video recording and reproducing unit 30A by using a menu screen with the OSD, a user first has to select the video recording and reproducing unit 30A from a list of video units, and then has to allow the selected menu screen with the OSD to be displayed to perform operation or manipulation. In contrast, in the video display system 1, a user first allows the menu screens with different OSD stereoscopic effects from each other to be displayed as shown in FIG. 7A and subsequently presses the back button 41 of the remote control unit 40 two times, to thereby select the menu screen M30A of the video recording and reproducing unit 30A. In other words, the menu screen may be intuitively selected without concerning about the selection of units.

[Effect]

As discussed above, the present embodiment is adapted for displaying concurrently plural menu screens corresponding to plural units and for selecting a menu screen from among these plural menu screens, and thereby the menu screen of a given unit may be selected without concerning about the units.

The present embodiment is adapted for selecting a menu screen from plural menu screens concurrently displayed with different OSD stereoscopic effects from each other, with the OSD stereoscopic effect by using a back button and a front button, and thereby the menu screen may be intuitively selected.

The present embodiment is adapted for storing the OSD stereoscopic effect value as a content of the unit information management table with the addresses of each unit together in the memory of the display unit, so as to manage the OSD stereoscopic effect, and thereby a menu screen and a unit, which has generated the menu screen, may be identified based on the stereoscopic effect values.

The above embodiment is adapted for emphasizing the menu screen of the unit to be operated, although it is not limited thereto. Alternatively, the menu screen of the unit to be operated may be relatively emphasized by, for example, displaying the menu screen, which is not to be operated, in a light color.

2. Second Embodiment

Next, a video display system 2 according to a second embodiment of the present disclosure will be discussed. The second embodiment is different from the first embodiment discussed above, in a display method in a case where a menu screen is selected from displayed plural menu screens of the units. Namely, while in the above first embodiment (FIGS. 7A and 7B), the selected menu screen may be displayed in an emphasis manner keeping its OSD stereoscopic effect, in the second embodiment, the selected menu screen may be displayed on the most-front side by modifying its OSD stereoscopic effect. The configuration of the video display system 2 is similar to that of the video display system 1 according to the first embodiment shown in FIG. 1, except that the control section 18 modifies the OSD stereoscopic effect value in the unit information management table TA stored in the memory 17 with each reception of the menu-screen selection signal from the remote control unit 40. The elements of the second embodiment substantially same as the video display system 1 according to the above first embodiment are denoted with the same reference numerals, and thus a description thereof will be appropriately omitted.

Figure 8:
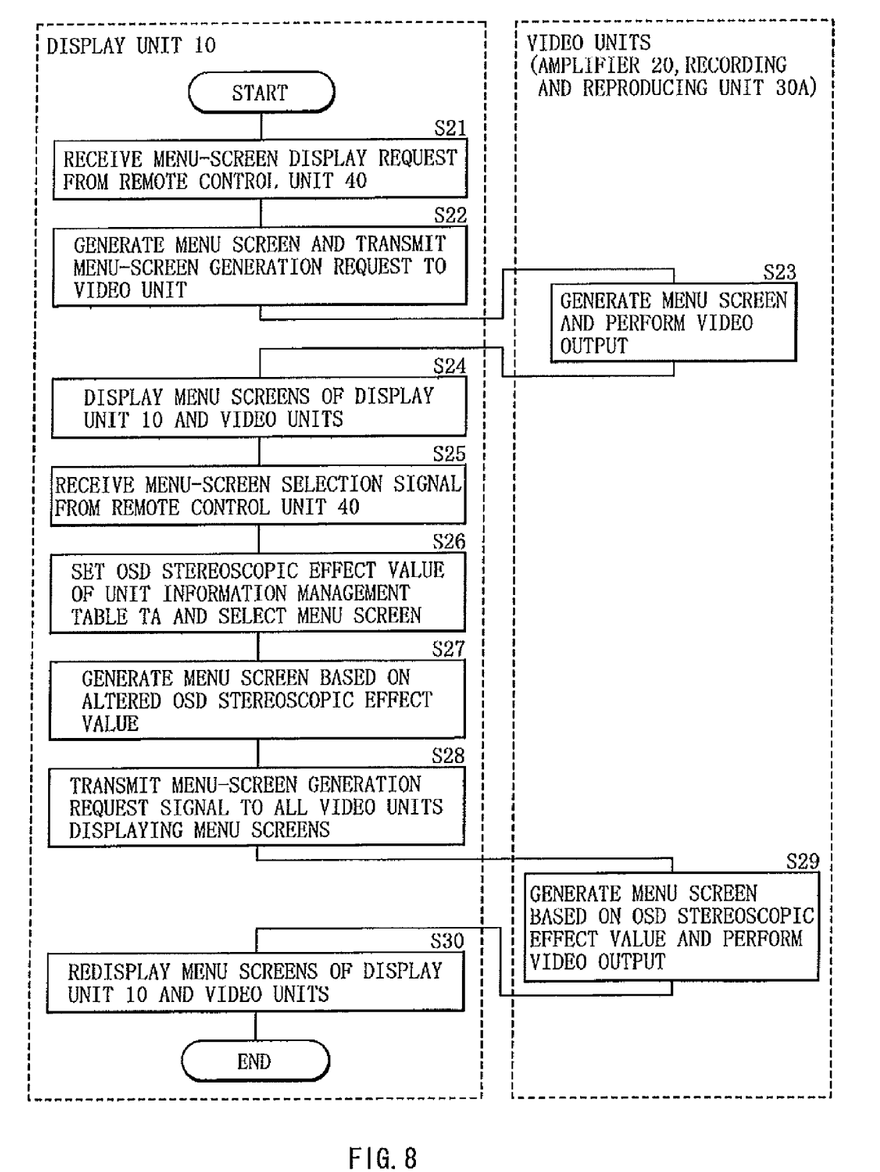
FIG. 8 is a flowchart illustrating an operation example of a video display system according to a second embodiment.

FIG. 8 shows a flowchart in the case where, after the display of the plural menu screens in the video display system 2 the selection of a menu screen to be operated from these menu screens is performed. Each of steps of the flow will be discussed in detail below.

First, the display unit 10 receives a menu-screen display request signal from the remote control unit 40 (step S21), and generates the menu screen and transmits the menu-screen generation request signal to the video units (step S22). Then, the video recording and reproducing unit 30A and the amplifier 20 generate the menu screens to perform video output (step S23), and the display unit 10 displays the menu screens of the display unit 10 and the video units (step S24). These operations are the same as the operations of the steps S1 to S4 shown in FIG. 6.

Figure 9A:
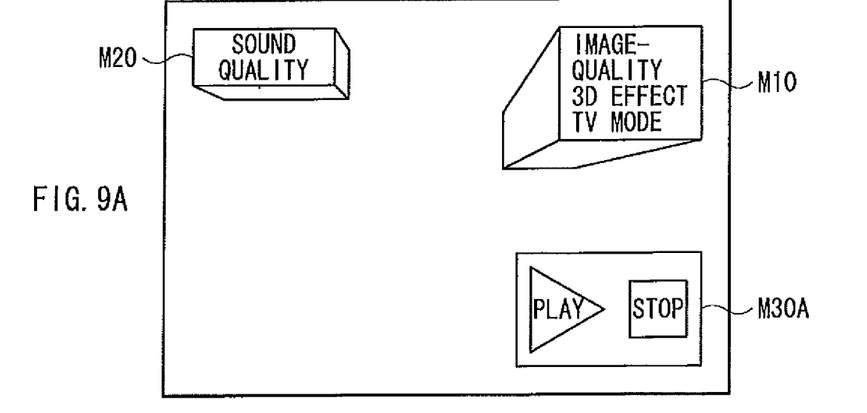
FIGS. 9A to 9C are diagrams explaining an operation example of the video display system according to the second embodiment.
Figure 9B:
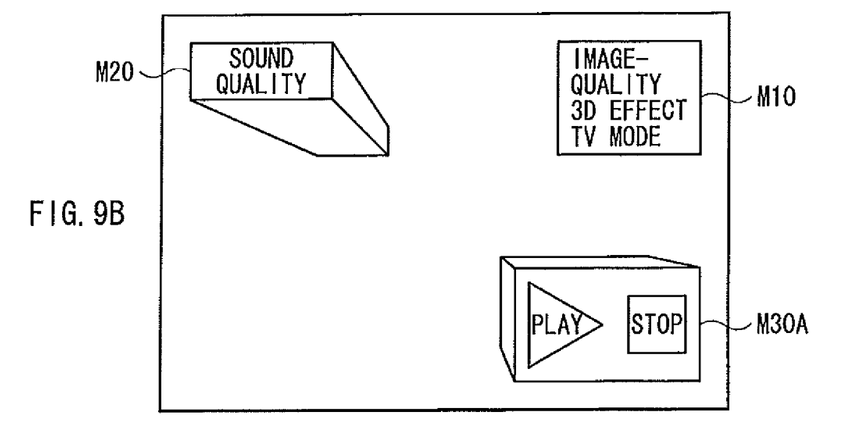
Figure 9C:
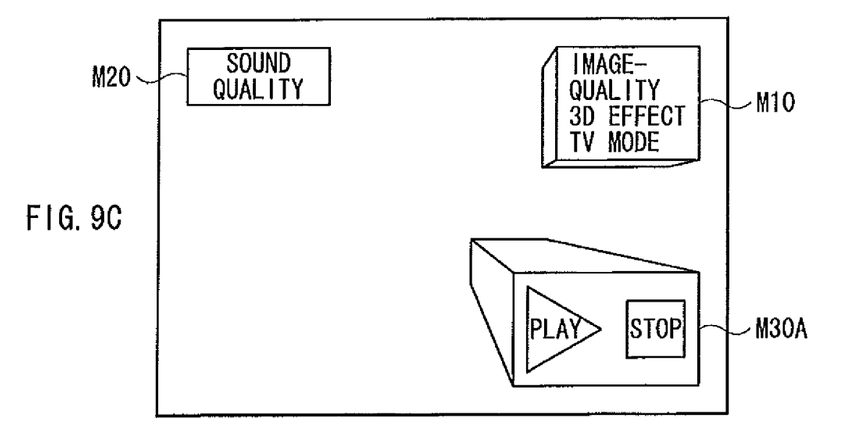

FIGS. 9A to 9C show display examples of the menu screen displayed in the display unit 10. FIG. 9A shows a case where a menu screen M10 of the display unit 10 is selected. FIG. 9B shows a case where a menu screen M20 of the amplifier 20 is selected. FIG. 9C shows a case where a menu screen M30A of the video recording and reproducing unit 30A is selected. The menu screens M10, M20, and M30A shown in FIG. 9A are displayed based on the unit information management table TA shown in FIG. 4. In the second embodiment, the most-front displayed menu screen represents an operable menu screen. That is, FIG. 9A shows that the menu screen M10 of the display unit 10 is operable.

Then, the display unit 10 receives the menu-screen selection signal from the remote control unit 40 (step S25). More specifically, upon press of the back button 41 or the front button 42 of the remote controller 40 by a user, the remote control unit 40 transmits the menu-screen selection signal to the RC receiving section 16 of the display unit 10 for receiving the menu-screen selection signal, as with the operation of step S5 shown in FIG. 6.

Next, the display unit 10 configures the setting of the OSD stereoscopic effect value included in the unit information management table TA and selects a menu screen (step S26). More specifically, the control section 18 of the display unit 10 rewrites the OSD stereoscopic effect value included in the unit information management table TA stored in the memory 17 based on the menu-screen selection signal received from the remote control unit 40 in step S25. Subsequently, a menu screen with the largest OSD stereoscopic effect, i.e. the menu screen to be displayed on the most-front side, is identified and selected. Thus, the display unit 10 may allow the selected menu screen to be operable.

As an example, in the menu screens displayed on the display unit 10, a case where the menu screen M10 of the display unit 10 is selected will be discussed in detail in FIG. 9A. In this case, in the display unit 10, upon the reception of the menu-screen selection signal from the remote control unit 40, the control section 18 of the display unit 10 alters or exchanges, in a cyclic fashion among the three menu screens, each of the OSD stereoscopic effects of the three menu screens, currently displayed, corresponding to the display unit 10, the amplifier 20, and the video recording and reproducing unit 30A, and rewrites the content of the unit information management table TA. That is, in the state shown in FIG. 9A, when a user presses the front button 42 of the remote control unit 40, the OSD stereoscopic effect of the amplifier 20 (logical address: "AMP1") is altered from numerous values "3" to "5", and the OSD stereoscopic effect of the video recording and reproducing unit 30A (logical address: "Recorder1") is altered from numerous values "1" to "3". Accordingly, both of the menu screens of the amplifier 20 and the video recording and reproducing unit 30A are configured so as to be displayed on the front side. Further, the OSD stereoscopic effect of the menu screen of the display unit 10 (logical address: "TV"), which has been displayed on the most-front side in FIG. 9A, is altered from numerous values "5" to "1", and the menu screen of the display unit 10 is configured so as to be displayed on the most-back side. Accordingly, the display unit 10 may select the amplifier 20 configured so as to be displayed on the most-front side.

Figure 10A:
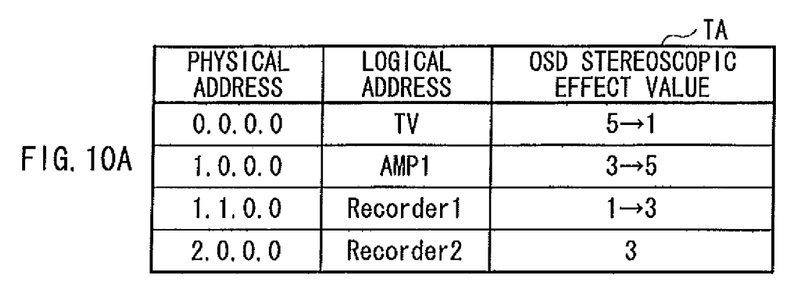
FIGS. 10A and 10B are other diagrams explaining an operation example of the video display system according to the second embodiment.
Figure 10B:
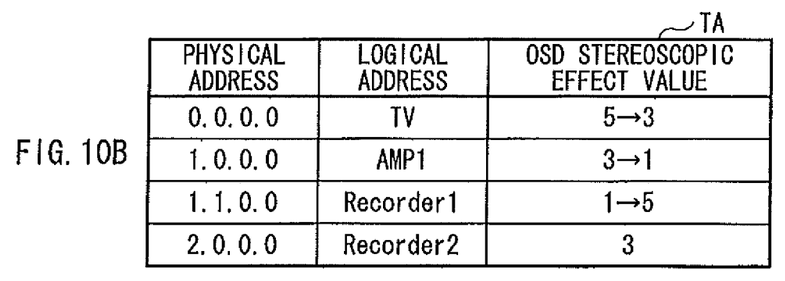

On the other hand, in the state in FIG. 9A, when a user presses the back button 41 of the remote control unit 40 as shown in FIG. 10B, the OSD stereoscopic effect of the display unit 10 (logical address: "TV") is altered from numerous values "5" to "3", and the OSD stereoscopic effect of the amplifier 20 (logical address: "AMP1") is altered from numerous values "3" to "1". Thus, both of the OSD stereoscopic effects of the display unit 10 and the amplifier are configured so that the menu screens are displayed on one step back side. Further, the OSD stereoscopic effect of the menu screen of the video recording and reproducing unit 30A (logical address: "Recorder1"), which has been displayed on the most-back side, is altered from numerous values "1" to "5", and thus the OSD stereoscopic effect of the video recording and reproducing unit 30A is configured so that the menu screen is displayed on the most-front side. Accordingly, the display unit 10 may select the video recording and reproducing unit 30A configured so as to be displayed on the most-front side.

Next, the display unit 10 generates a menu screen based on the altered OSD stereoscopic effect value (step S27). More specifically, the OSD generating section 13 of the display unit 10 generates the stereoscopic menu screen based on the OSD stereoscopic effect value of the unit information management table TA stored in the memory 17.

Next, the display unit 10 transmits a menu-screen generation request signal to all video units for which a menu screen is being displayed (step S28). More specifically, in the display unit 10, the control section 18 generates the menu-screen generation request signals for all video units connected directly and indirectly to the terminal selected as an input terminal of the display unit 10, together with each of the OSD stereoscopic effect values of the units included in the unit information management table TA. Then, the HDMI transmitting and receiving section 11 transmits these menu-screen generation request signals as the CEC control signals to each of the video units. In the exemplary embodiment, the HDMI transmitting and receiving section 11 transmits the menu-screen generation request signal via the terminal T1 to the amplifier 20 and the video recording and reproducing unit 30A, together with the OSD stereoscopic effect values of those units.

Next, the video unit generates a stereoscopic menu screen based on the received OSD stereoscopic effect value to perform video output (step S29). More specifically, in the video recording and reproducing unit 30A, the OSD generating section 32 generates the stereoscopic menu screen based on the received OSD stereoscopic effect value. Then, the video processor 33 generates video information in which the menu screen is superimposed on the video information supplied by the recording and reproducing section 31, and subsequently the HDMI transmitting and receiving section 34 transmits the generated video information via the amplifier 20 to the display unit 10. Further, in the amplifier 20, the OSD generating section 22 generates the stereoscopic menu screen based on the received OSD stereoscopic effect value. Then, the video processor 23 generates video information in which the menu screen is superimposed on the video information supplied by the HDMI transmitting and receiving section 21, and subsequently the HDMI transmitting and receiving section 24 transmits the generated video information to the display unit 10.

Next, the display unit 10 redisplays each of the menu screens of the display unit 10 and the video units (step S30). More specifically, as in step S11 of FIG. 6, the video processor 14 of the display unit 10 superimposes the menu screen of the display unit 10 on the video information supplied by the amplifier 20 via the HDMI transmitting and receiving section 11, and subsequently the display section 15 displays the generated video information. Thus, in the display unit 10, as shown in FIGS. 9B and 9C, the menu screens are displayed with different OCD stereoscopic effects from those of the screens (shown in FIG. 9A) displayed in step S24. The screen shown in FIG. 9B corresponds to the unit information management table TA shown in FIG. 10A. That is, in FIG. 9B, the menu screen M20 of the amplifier 20 with the largest OSD stereoscopic effect (logical address: "AMP1") is displayed on the most-front side, for example. Similarly, the screen shown in FIG. 9C corresponds to the unit information management table TA shown in FIG. 10B. That is, in FIG. 9C, the menu screen M30A (logical address: "Recorder1") corresponding to the video recording and reproducing unit 30A with the largest OSD stereoscopic effect is displayed on the most-front side, for example.

This ends the process in the flowchart shown in FIG. 8. After the completion of the process, a user may perform manipulation of the menu screen displayed on the most-front side. More specifically, for example, when a user presses the up/down/left/right button on the remote control unit 40, the display unit 10 transmits the CEC control signal corresponding to the above manipulation to the display 10 or the video unit, which has generated the menu screen selected in step S26. Alternatively, if the selection of another menu screen is performed, the process may be returned to step S25 to manipulate the remote control unit 40 again.

[Effect]

The second embodiment alters OSD stereoscopic effect of each of menu screens with each of the press of a back button and a front button and thus allows the menu screen displayed on the most-front side to be operable. Thereby, the embodiment allows the intuitive selection of a menu screen of a unit to be operated. Other effects are similar to those achieved in the first embodiment.

Although the technology has been described in the foregoing by way of example with reference to the embodiments, the technology is not limited thereto but may be modified in a wide variety of ways.

For example, each of the above embodiments provides the back button 41 and the front button 42 in the remote control unit 40, although it is not limited thereto. Alternatively, for example, only either of the back button 41 and the front button 42 may be provided. Even in this case, the menu screen to be operated may be selected by pressing, for example, the back button 41 more than once, and thus effects similar to those of the above embodiments may be achieved.

Further, for example, in each of the above embodiments, all of the video units have a mechanism for generating the stereoscopic menu screen based on the above OSD, although it is not limited thereto. Some video units may not have the mechanism. Even in this case, the video units may be controlled as discussed above except the video unit without the mechanism, and may achieve effects similar to those of the embodiments.

Further, for example, in each of the above embodiments, each of the video units is adapted for generating the menu screen of that video unit to transmit the thus-generated menu screen to the display unit, although it is not limited thereto. Alternatively, for example, each of the video units may transmit to the display unit only text information of a menu screen to be finally displayed, and the display unit may generate a stereoscopic menu screen based on the text information. In this case, as shown in FIG. 1, in the amplifier 20, the OSD generating section 22 may not be used or eliminated; the control section 26 generates text information for the menu screen; and the HDMI transmitting and receiving section 24 transmits such text information to the display unit 10. Similarly, in the video recording and reproducing unit 30A, the OSD generating section 32 may not be used or eliminated; the control section 36 generates text information for the menu screen; and the HDMI transmitting and receiving section 34 transmits such text information to the display unit 10 via the amplifier 20. In the display unit 10, the HDMI transmitting and receiving section 11 receives such text information; and the OSD generating section 13 generates menu screens of the display unit 10, the amplifier 20, and the video recording and reproducing unit 30A based on such text information. Even in this case, effects similar to those of the above embodiments may be achieved.

Further, for example, in each of the above embodiments, the connection between the video units and the display unit 10 are established using the HDMI, although it is not limited thereto. The connection may be established in any way having a similar function.

It should be understood by those skilled in the art that various modifications, combinations, sub-combinations and alternations may occur depending on design requirements and other factors insofar as they are within the scope of the appended claims or the equivalents thereof.

What is claimed is:
1. A display device comprising:
a display section displaying a stereoscopic video image; and
a display control section performing a control to allow the display section to display a plurality of menu screens including a first menu screen and a second menu screen with different stereoscopic effects, the first menu screen being provided for each of one or more video devices connected to the display device, and the second menu screen being provided for the display device.

2. The display device according to claim 1,
wherein the display control section receives a selection operation for selecting any one menu from the plurality of menu screens, and allows the display section to display the selected menu screen together with a signification which shows that the menu screen on display is currently selected.

3. The display device according to claim 2, further comprising a menu-screen generating section generating at least the second menu screen.

4. The display device according to claim 3, further comprising:
a transmitting section transmitting a menu-information request signal to the video devices; and
a receiving section receiving menu information from the video devices.

5. The display device according to claim 4, wherein the menu information is image data configuring the first menu screen.

6. The display device according to claim 4, further comprising a device information holding section holding device information which includes a device address of each of the display device and the video devices and includes a stereoscopic effect value of each of the plurality of menu screens,
wherein the menu-screen generating section generates the plurality of menu screens, based on the device information.

7. The display device according to claim 6, wherein the transmitting section transmits the menu-information request signal to the video device, based on the device information.

8. The display device according to claim 2, wherein the control section selects another menu screen with second largest or second smallest stereoscopic effect from the plurality of menu screens, each time the display control section receives a menu-screen selection signal from a remote controller.

9. The display device according to claim 2, wherein the control section selects the menu screen with largest stereoscopic effect by cyclically exchanging stereoscopic effect of each of the plurality of menu screens, each time the display control section receives the menu-screen selection signal from a remote controller.

10. The display device according to claim 1, wherein the menu screen is superimposed on video information.

11. A video device comprising:
a receiving section receiving a menu-information request signal from a display device which is configured to display a first menu screen for the video device and a second menu screen for the display device with different stereoscopic effects; and
a transmitting section transmitting menu information to the display device.

12. The video device according to claim 11, further comprising a menu-screen generating section generating the first menu screen for the video device,
wherein the transmitting section transmits image data configuring the first menu screen for the video device as the menu information.

13. A menu-screen display method comprising:
displaying, on a display section, a plurality of menu screens including a first menu screen and a second menu screen with different stereoscopic effects, the first menu screen being provided for each of one or more video devices, and the second menu screen being provided for a display device;
receiving a selection operation for selecting any one menu from the plurality of menu screens; and
displaying the selected menu screen together with a signification which shows that the menu screen on display is currently selected.

14. A video display system comprising:
a display device; and
one or more video devices connected to the display device,
wherein the display device includes:
a display section displaying a stereoscopic video image; and
a display control section performing a control to allow the display section to display a plurality of menu screens including a first menu screen and a second menu screen with different stereoscopic effects, in which the first menu screen is provided for each of the one or more video devices, and the second menu screen is provided for the display device, and
wherein the video device includes:
a receiving section receiving a menu-information request signal from the video devices; and
a transmitting section transmitting the menu information to the video devices.

* * * * *